July 2, 1957  R. E. GREENOUGH  2,797,971
SECTIONAL FLUID SEAL
Filed Nov. 14, 1955

INVENTOR.
RAYMOND E. GREENOUGH
BY
ATTORNEY

United States Patent Office 2,797,971
Patented July 2, 1957

2,797,971

SECTIONAL FLUID SEAL

Raymond E. Greenough, Berea, Ohio, assignor to The Cleveland Pneumatic Tool Company, Cleveland, Ohio, a corporation of Ohio Application November 14, 1955, Serial No. 546,727

3 Claims. (Cl. 309—23)

This invention relates to fluid seals and more particularly to a back up ring for use in combination with an O ring type seal which provides means for lubricating the seal.

It is an important object of this invention to provide a new and improved lubricating back up ring for use in conjunction with dynamic fluid seals.

It is another important object of this invention to provide a combination dynamic seal and back up ring therefore which includes means for lubricating the seal.

It is still another object of this invention to provide a back up ring for use with dynamic seals which comprise two relatively rigid back up rings one on either side of a lubricant impregnated wick member.

Further objects and advantages will appear from the following description and drawings, wherein.

The use of O rings as dynamic seals in pneumatic cylinders has presented difficulty because of wear caused by lack of lubrication. In the past it has been necessary to provide external means to supply lubrication for the O ring. This has presented problems particularly when the O ring is to be mounted on the piston of a piston and cylinder motor. In the preferred embodiment of this invention, the back up ring used in conjunction with the O ring seal is provided with a lubricant reservoir which produces a thin coating of lubricant on the surface to be sealed each time the seal operates. By the proper choice of lubricant for the particular application, it is possible to maintain the lubrication on the seal surface for long periods of time.

Figure 1:
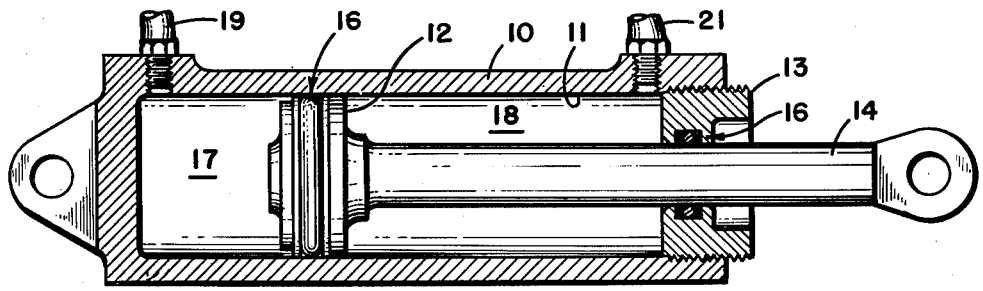
Figure 1 is a side elevation in longitudinal section showing the preferred form of this invention as applied to a fluid motor of the piston and cylinder type.

Referring to the drawings, Figure 1 discloses a typical fluid cylinder of the pneumatic type wherein a cylinder 10 is provided with a bore 11 along which a piston 12 moves. A gland member 13 threaded into the end of the cylinder 10 provides a radial bearing to laterally support a piston rod 14. The piston 12 and the gland member 13 are each provided with similar seal assemblies 16 so that leakage past the piston and piston rod is prevented. Therefore, the piston 12 divides the cylinder into a first chamber 17 and a second chamber 18. Suitable pressure lines 19 and 21 provide a connection with the chambers 17 and 18 respectively. Therefore, if air under pressure is supplied to the chamber 17 through the pressure line 19, a force is developed on the piston 12 moving the piston rod 14 to the right. Conversely, if air under pressure is supplied to the chamber 18 through the pressure line 21, a force is developed on the piston 12 which moves the piston rod 14 to the left. Both of the seal assemblies 16 are structurally similar and function in the same manner so only the seal assembly 16 which is mounted on the piston 12 will be discussed in detail.

Figure 2:
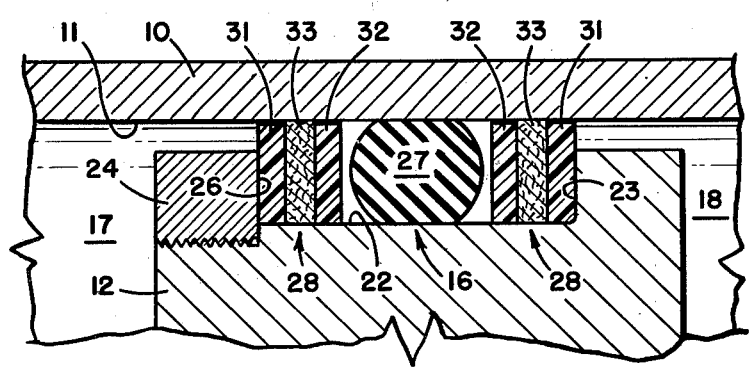
Figure 2 is an enlarged fragmentary section showing the structural details of the seal and back up rings when no pressure is applied across the seal; and, Figure 3 is a view similar to Figure 2 showing the position the elements assume when a pressure differential is applied across the seal.
Figure 3:
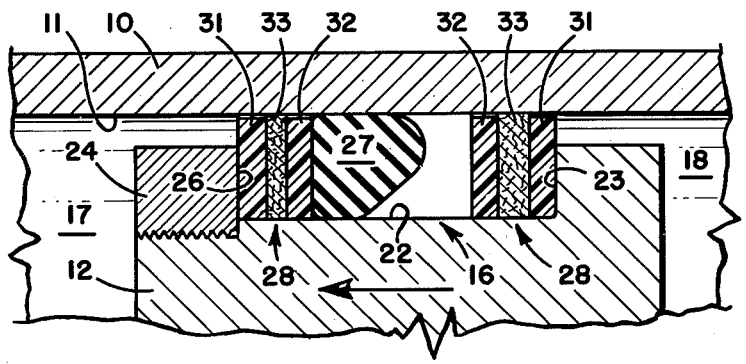

Referring to Figures 2 and 3, the piston 12 is provided with an axially extended surface 22 terminating in a shoulder 23. An end member 24 is threaded onto the piston 12 and is provided with a shoulder 26 which opposes the shoulder 23 and in cooperation therewith forms an annular U-shaped groove around the piston which is open to the bore 11. An O ring type resilient seal 27 is positioned in the groove between similar back up ring assemblies 28. Each of the assemblies includes a pair of relatively rigid rings 31 and 32 preferably formed of Teflon or other suitable plastic material. Positioned between the two rings 31 and 32 is a wick or felt ring 33 which is impregnated with a suitable lubricant. Thus the O ring seal 27 is positioned between composite back up ring assemblies which provide a reservoir for the lubricant.

In operation if pressure fluid is supplied to the chamber 18, the piston 12 will move to the left as indicated by the arrow in Figure 3. The pressure fluid also causes the O ring 27 to be deformed against the left hand back up ring assembly pressing the ring 32 in the direction of the ring 31 thereby squeezing the felt ring 33 therebetween. This forces a limited amount of lubricant out of the felt ring 33 so that the bore 11 will be provided with a thin film of lubricant. When pressure is supplied to the chamber 17, the O ring presses against the right hand back up ring assembly 28 and provides lubrication to the bore 11 in the same manner. Those skilled in the art will recognize that in a fluid motor the piston always moves away from the region of pressure. Since the O ring seal 27 also tends to move away from the region of pressure, it will press in the direction of piston movement. Thus the bore 11 is lubricated ahead of the O ring as it moves along the cylinder. If a seal according to this invention is to be used on a compressor or pump, the seal should be mounted on the cylinder instead of the piston. This is because the piston in such devices moves in a direction toward the region of pressure. However, since the O ring seal tends to squeeze away from the region of pressure, the portion of piston surface approaching the O ring seal would then be lubricated.

By providing relatively rigid rings 31 and 32 in the back up ring assembly, extrusion of the O ring 27 between the back up rings and the bore 11 is virtually eliminated. This is due to the fact that the rigid rings are provided with a close fit in the bore 11 so that a very small clearance is provided therebetween. Since the rings 31 and 32 are relatively rigid, it is necessary to provide an end member 24 so that the back up ring assemblies may be positioned in the groove without necessitating stretching or the like.

When choosing the lubricant, two things should be kept in mind. First, the temperature at which the device must operate, and second, the number of cycles through which the device will have to operate without service. Generally speaking, I prefer to use an Aluminum Stearate base grease because of its ability to resist water as well as operate at high temperatures. Also, the longer the device must operate without service, the heavier the grease should be so that all of the grease will not be squeezed out of the felt ring too quickly. Because the two rings 31 and 32 are relatively rigid, the grease will be uniformly applied to the surface of the bore 11 each time the motor operates. Also the relatively rigid rings insure that all of the felt rings will be squeezed so that substantially all of the grease will be available for lubrication.

Although a preferred embodiment of this invention is illustrated, it will be realized that various modifications of the structural details may be made without departing

I claim:

1. In a device of the character described, piston and cylinder members capable of relative axial movement in both directions, means admitting pressure fluid on said members to produce axial forces thereon, one of said members being formed with a U-shaped groove open to the other member, a resilient seal ring in said groove in engagement with said other member positioned between a pair of back up assemblies preventing pressure fluid from passing thereby in either direction, each of said assemblies including an annular ring engaging said other member formed of a flexible porous material impregnated with lubricant positioned between a pair of relatively rigid rings, the rigid ring of each assembly remote from said seal ring being engageable with one wall of said groove to limit movement of each assembly in a direction away from said seal ring, the other rigid ring of each assembly being positioned for engagement by said seal ring whereby said seal ring is urged axially by said pressure fluid into such engagement and moves said other rigid ring toward said remote rigid ring and squeezes lubricant from said porous ring onto said other member, said pressure fluid moving said seal ring relative to said one member in the same direction as said one member moves relative to said other member regardless of the direction of said movement.

2. In a fluid motor comprising piston and cylinder members capable of relative axial motion in either direction in response to pressure fluid imposed thereon, one of said members being formed with an annular U-shaped groove open to the other member, a resilient seal ring in said groove in engagement with said other member positioned between a pair of back up assemblies, each of said assemblies including an annular ring engaging said other member formed of a flexible porous material impregnated with lubricant positioned between a pair of relatively rigid rings, the rigid ring of each assembly remote from said seal ring being engageable with one wall of said groove to limit movement of each assembly in a direction away from said seal ring, the other rigid ring of each assembly being positioned for engagement by said seal ring whereby such engagement moves said other rigid ring toward said remote rigid ring and squeezes lubricant from said porous ring onto said other member, said pressure fluid moving said seal ring relative to said one member in the same direction as said one member moves relative to said other member in response to said pressure fluid whereby said other member is lubricated ahead of said seal regardless of the direction of said movement.

3. A dynamic seal assembly adapted to be mounted between two cooperating piston and cylinder members capable of axial movement relative to one another, including a resilient seal ring, a pair of first and second relatively rigid rings on each side of said seal ring, and lubricant containing material between said first and second rings engaging one of said members to lubricate same ahead of said seal ring irrespective of the direction of said axial movement.

References Cited in the file of this patent

UNITED STATES PATENTS

| | | |
|---|---|---|
| 1,889,591 | Boerlage | Nov. 29, 1932 |
| 2,004,669 | Miller | June 11, 1935 |
| 2,349,170 | Jackman | May 16, 1944 |
| 2,428,452 | Farmer | Oct. 7, 1947 |